No. 795,765. PATENTED JULY 25, 1905.
J. W. GRAEME.
NUT LOCK.
APPLICATION FILED JULY 15, 1904.
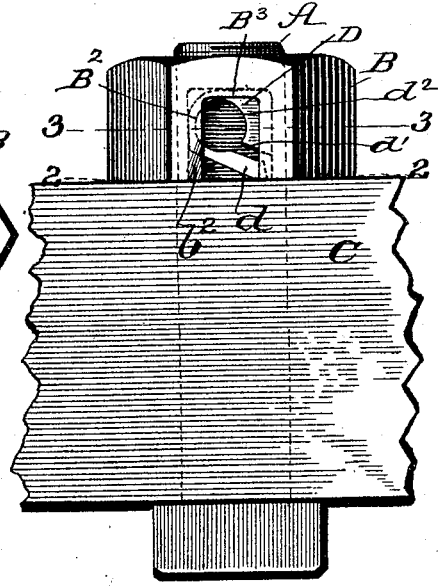
Fig. 1.
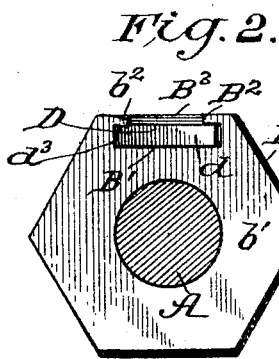
Fig. 2.
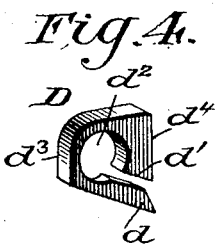
Fig. 4.
Fig. 5.
Fig. 8.
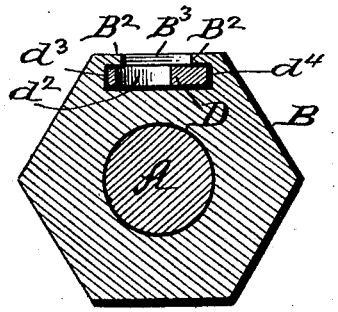
Fig. 3.
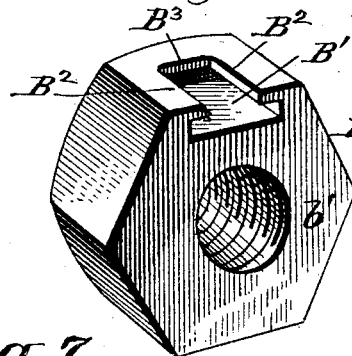
Fig. 6.
Fig. 9.
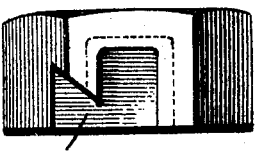
Fig. 7.
WITNESSES:
Jos. A. Ryan
Perry B. Turpin
INVENTOR
Joseph W. Graeme
BY Munn & Co.
ATTORNEYS

UNITED STATES PATENT OFFICE.

JOSEPH WRIGHT GRAEME, OF WASHINGTON, DISTRICT OF COLUMBIA.

NUT-LOCK.

No. 795,765.        Specification of Letters Patent.        Patented July 25, 1905.

Application filed July 15, 1904. Serial No. 216,713.

*To all whom it may concern:*

Be it known that I, JOSEPH WRIGHT GRAEME, a citizen of the United States, residing at Washington, in the District of Columbia, have made certain new and useful Improvements in Nut-Locks, of which the following is a specification.

My invention is an improvement in nut-locks, and particularly in that class of nut-locks in which a pawl carried by the nut engages with an abutment, the present invention consisting in certain novel constructions and combinations of parts, as will be hereinafter more fully described and claimed.

In the drawings, Figure 1 is a side elevation of a bolt and nut with the nut locked according to my invention. Fig. 2 is a sectional view on about line 2 2 of Fig. 1. Fig. 3 is a sectional view on about line 3 3 of Fig. 1. Fig. 4 is a detail perspective view of the locking-pawl. Fig. 5 is a detail side view of the locking-pawl. Fig. 6 is a detail perspective view of the nut, showing the recess therein for the locking-pawl. Fig. 7 is a detail side view of a nut, showing a somewhat different construction from that presented in Fig. 6; and Fig. 8 shows a slightly different construction of locking-pawl from that shown in Figs. 4 and 5, and Fig. 9 is an edge view showing a dished or deflected pawl.

In the construction shown in Fig. 1 the bolt A, nut B, and abutment C may be of any suitable construction, except as hereinafter specified.

The nut B is provided in one of its faces with a recess B', extending inwardly from the inner face $b'$ of the nut and having its side walls $B^2$ and its inner end wall $B^3$ undercut to overlie the locking-pawl, as shown in Figs. 1, 2, and 3. The undercut wall $B^2$ is in practice bent in or depressed at its outer end at $b^2$, as shown in Figs. 1 and 2, in order to retain the locking-pawl when the latter is inserted in the recess B', as shown in Fig. 1.

The locking-pawl D is of a special construction, being made in the form of a coil or bow, as shown in Figs. 4 and 5, with its ends $d$ and $d'$ brought adjacent to each other and spaced slightly apart, the end $d$ projecting and being arranged at an incline to form a pawl-point to bite into the abutment, as shown in Fig. 1, and the end $d'$ being arranged to form a stop to limit the retracting movement of the pawl-point $d$, the center $d^2$ of the pawl being open so the inclined pawl-point $d$ may spring readily in operation. As shown, the locking-pawl is made non-circular in cross-section and preferably has its opposite sides $d^3$ and $d^4$ made straight and parallel, so they fit against the square sides of the nut-recess B' and so operate to hold the locking-pawl from turning within the said recess and preserving the said locking-pawl in proper position for operation when seated in the nut, as shown. In one view of the matter the locking-pawl comprises a body portion to fit in a recess in a nut and having a pawl-point $d$ at one end and a returned stop portion $d'$ at its other end. When this pawl-point is applied to a recessed nut, it will be noticed that I furnish a locking-pawl which is bent at one end to fit and be held in the recess in the nut and projects at its other end beyond the inner face of the nut, forming a pawl-point or toe to engage an abutment against which the nut may be turned. In the special construction shown in detail in Figs. 4 and 5 and applied for use in Fig. 1 the locking-pawl has its ends $d$ and $d'$ thickened, and this construction may preferably be made by drop-forging or punching, although it is manifest it may be produced in any other suitable manner. In Fig. 8 I show a somewhat different construction of locking-pawl possessing many of the characteristics of the pawl shown in Fig. 4 and before described and which may be bent from a suitable length of wire preferably or from sheet metal, in which case Fig. 8 shows the edge of said sheet metal.

While the locking-pawl may be of any suitable material, it will be preferably made of spring-steel hardened upon its projecting point or toe $d$ only, the remainder of the pawl being resilient, and the coiled or bow shape of the locking-pawl giving a greater length of spring than can practically be secured in the use of a straight pawl. When the locking-pawl is seated in the recess, as shown in Fig. 1, the undercut wall $b^2$ may be depressed or bent in to retain the pawl in shape. To release the pawl D, any suitable instrument may be inserted beneath the point $d$ to raise the same up clear of the abutment.

In Fig. 7 I show a nut whose overhanging wall at the side opposite the pawl-point is cut away slightly at E, so an instrument may be inserted endwise in the direction of the arrow in Fig. 7 to force the pawl point or toe $d$ clear of the abutment, so the nut may be turned back to release the same. In this or the preferred construction the pawl may be retained in the recess by bending over a portion of the undercut wall or by slightly dishing the pawl, as shown in Fig. 9, and driving it in the recess.

It will be understood that my improved locking-pawl may be applied to a bolt-head as well as to a nut, and I do not desire to be limited in the use of my invention to its application to a nut movable on a bolt, as it may be applied to a bolt-head, and I desire that the use of the word "nut" in the appended claims may be understood as comprising a head fixed on a bolt as well as a head threading on said bolt in the form of what is commonly termed a "nut."

When the locking-pawl is seated in a recess in the nut, as shown in Fig. 1, it will be out of the way of the wrench and will not be injured by or interfere with the application of the wrench to the nut.

Manifestly the invention may be applied to right or left hand nuts, the change necessitating merely a reversal of the pawl.

Having thus described my invention, what I claim as new, and desire to secure by Letters Patent, is—

1. A nut-lock comprising a nut and a locking-pawl bent in the form of a coil or bow having one end projecting at an incline and forming a pawl point or toe, and its other end arranged above and spaced apart from the pawl-point and forming a stop to limit the retractile movement of the pawl-point, the opposite sides of the pawl being straight and parallel to seat within a recess in a nut, substantially as set forth.

2. A nut-lock comprising a nut and a locking-pawl in the form of a coil or bow, having its ends brought adjacent to each other with one end projecting to form a pawl-point and its other end arranged to form a stop to limit the movement of the pawl-point and its exterior made non-circular to prevent the turning of the locking-pawl in the recess in a nut.

3. A nut-lock comprising a nut and a pawl in the form of a coil or bow having its ends brought adjacent to each other and having its sides approximately straight whereby to prevent its turning when seated in the recess in a nut, one end of the coil or bow projecting to form a pawl point or toe, substantially as set forth.

4. The combination of a nut recessed from its inner face for a locking-pawl, and a locking-pawl bent between its ends and fitting and held at such intermediate position in the recess in the nut and projecting at its point end beyond the inner face of the nut forming a pawl point or toe to engage an abutment, and arranged at its other end to form a stop to limit the retracting movement of the point end of the pawl.

5. The combination of a nut having an undercut recess for a pawl and a pawl fitting in said undercut recess, one of the undercut walls being bent or depressed whereby to retain the pawl in the recess substantially as set forth.

6. The combination of the nut or bolt head having a recess extending through its inner end and having the opposite undercut walls of said recess extending approximately parallel, the inner or top wall of the recess connecting the side walls, and a pawl having its opposite sides straight and coinciding with their respective undercut walls of the recess and the top side of the pawl being straight and horizontal and coinciding with the corresponding walls of the recess, whereby to keep the pawl rigidly in its seat in said recess and to prevent the canting or displacement of the pawl.

7. The combination of a nut substantially as described having in one of its sides a recess extending from its inner face and having undercut walls and a locking-pawl held in said recess by its undercut walls and provided at one end with a pawl point or toe projecting beyond the inner face of the nut and arranged at its other end to form a stop for engagement by the point end to limit the retracting movement of same, substantially as set forth.

8. The combination of a nut having in one of its sides a recess extending from its inner face and having undercut walls and a locking-pawl in the form of a bow held in said recess by its undercut walls and having one end projecting to form a pawl point or toe and its other end arranged to limit the retracting movement of said pawl point or toe, substantially as set forth.

JOSEPH WRIGHT GRAEME.

Witnesses:
   SOLON C. KEMON,
   PERRY B. TURPIN.